United States Patent Office 2,755,305
Patented July 17, 1956

2,755,305

PREPARATION OF DIBENZENOID ALKYL SULFIDES

Joseph B. Stucker, Des Plaines, and Elmer W. Brennan, Carpentersville, Ill., assignors to The Pure Oil Company, Chicago, Ill., a corporation of Ohio No Drawing. Application January 18, 1951, Serial No. 206,716

21 Claims. (Cl. 260—608)

The invention is directed to an improved method for the production of dibenzenoid alkyl sulfides and related compounds—that is, organic sulfide compounds of the class having two alkyl benzene or alkyl benzenoid ring structures linked together through side chain alkyl groups by one or more sulfur atoms. The term benzenoid as used herein means any grouping of carbon atoms into a ring structure which is related to benzene, naphthalene or anthracene. Examples of these organic sulphide compounds are: the dibenzenoid alkyl mono-, di-, and trisulfides as dibenzyl sulfide, dibenzyl disulfide; the alkyl naphthalene mono-, di-, and trisulfides and the alkyl anthracene mono-, di-, and trisulfides as, for example, dimethyl naphthalene sulfide, dimethyl naphthalene disulfide, dimethyl anthracene sulfide, dimethyl anthracene disulfide, dixylyl sulfide, and dixylyl disulfide.

The primary object of this invention is to provide a method for the preparation of organic sulfides, particularly dibenzenoid alkyl sulfides and like compounds in an efficient and economic manner.

A second object of this invention is to provide a method for purifying dibenzenoid alkyl sulfides and like compounds prepared by the reaction of the corresponding benzenoid alkyl halide with an alkali metal sulfide in aqueous solution and in the presence of an excess of sulfur.

A third object of this invention is to provide a new method of purifying dibenzenoid alkyl sulfides as, for example, dibenzyl disulfide, by causing the sulfide product to separate from the reaction mass through a change in density of the reaction mass either through dilution or the addition of a solute such as a metal salt soluble therein.

Other objects and advantages of this invention will become apparent as the description thereof proceeds.

The general reaction for the preparation of organic sulfide compounds of the class herein described may be illustrated by the reaction of benzyl chloride with sodium disulfide or monosulfide to yield dibenzyl disulfide or dibenzyl sulfide. The sodium disulfide is prepared by the reaction of sodium monosulfide with sulfur in an aqueous solution. Two moles of benzyl chloride combine with one mole of sodium disulfide to form one mole of dibenzyl disulfide and two moles of sodium chloride according to the following equation:

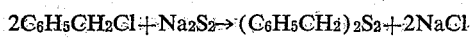

$2C_6H_5CH_2Cl + Na_2S_2 \rightarrow (C_6H_5CH_2)_2S_2 + 2NaCl$

From this equation it is apparent that an excess of sodium disulfide should be maintained during the reaction. For this purpose the prior art teaches that it is preferred to use approximately 7.5 parts by weight of sodium sulfide, 3 parts by weight of sulfur, 16.5 parts by weight of benzyl chloride and 73 parts by weight of water.

It is customary to first add the sodium sulfide, sulfur and water to the reaction vessel and apply heat and agitation to form the sodium disulfide. The solution is then cooled to 170±5° F. and the benzyl chloride, either with or without a solvent, is added gradually with agitation. If no solvent is used the reaction mixture is heated to about 212° F. at which temperature refluxing begins. After about one to two hours the reaction is complete and the dibenzyl disulfide is extracted with a water-immiscible solvent. Both benzyl chloride and dibenzyl disulfide are immiscible with water, but upon completion of the reaction the dibenzyl disulfide does not readily separate from the reaction mass. To overcome this, one expedient has been to use a mutual solvent such as alcohol to obtain intimate contact of reactants during the reaction and to provide a means of product separation. Using this method the homogeneous alcoholic reaction mixture is subjected to reflux conditions with stirring at elevated temperatures. After several hours of reflux the reaction is complete. The reaction mixture is then cooled and the dibenzyl disulfide recovered by repeated crystallization and extended washing of the crystals. Distillation of the resulting wash solutions is required to recover the alcohol and further quantities of dibenzyl disulfide therefrom. This method is wasteful and expensive because of the losses of alcohol which are inherent to the process.

It is also known to prepare dibenzyl disulfide from the same reactants in a heterogeneous system with or without a water-immiscible solvent for the dibenzyl disulfide. When this reaction is carried out with a solvent, it is conducted under reflux and upon completion and settling the lower aqueous layer is drawn off from the heterogeneous system. The upper solvent layer is filtered hot and cooled to crystallize the dibenzyl disulfide. By this process repeated crystallization and recycle of the filtrate are necessary to attain economy of operation and product yield. The alternative procedure is to conduct the reaction in the absence of any solvent in which event the reaction temperature becomes approximately that of the boiling point of the aqueous reaction mass. Upon completion of the reaction, it is necessary to extract the dibenzyl disulfide with a water-immiscible solvent. Again repeated crystallization is necessary.

Another method comprises reacting benzenoid alkyl halides with an aqueous solution of sodium polysulfide in the absence of any mutual solvent for the reactants and controlling the reaction temperature below boiling by stepwise addition of the benzenoid alkyl halide to the reaction mass. Under this method, the product is separated by allowing the resulting mixture to cool and the product to solidify and mechanically separating the product from the aqueous medium.

The present invention is based on the discovery that the use of a solvent either during or at the end of the reaction is no longer necessary in order to purify and separate these organic sulfide compounds. It has been found that dibenzenoid alkyl sulfides, not ordinarily prone to separate by themselves due to small differences in density between the product and the aqueous phase of the reaction mass, may be purified and separated therefrom by changing the density of the aqueous phase through dilution or by the addition of a solute. This change in density is accomplished while the reaction mixture is at a temperature at least above the melting point of the dibenzenoid alkyl sulfides in order that the product will be maintained in a liquid state during its separation. The majority of organic sulfides of the class described herein have melting points between about 150° F. and the boiling point of the aqueous phase of the reaction mass; and for this reason may be separated in the liquid form while the reaction mass is maintained within this temperature range. Dibenzyl disulfide melting at about 160° F. is readily separated in the liquid form while the reaction mass is maintained at substantially the reaction temperature of 170° to 175° F.

It is also essential that the density of the dibenzenoid alkyl sulfide be different from that of the aqueous phase upon completion of the density change procedure. It is preferred that the sulfide product have a density which is greater than the aqueous phase thus facilitating the removal as the lower liquid layer, although this is not essential. The densities of organic sulfide compounds, as prepared in accordance with this invention will, in general, be greater than that of the diluted aqueous reaction phase.

This discovery has as its principal advantage the elimination of the tedious, wasteful and time-consuming purification methods of the prior art. Using the present method it is no longer necessary to conduct the reaction in the presence of a solvent for the product nor is it necessary to extract the product upon completion of the reaction. In addition the present method eliminates the steps of allowing the reaction mixture to cool and separating the product as a solid by decantation or filtration.

The general procedure, according to this invention, comprises reacting the optimum proportions of benzenoid alkyl halide, sodium sulfide, sulfur and aqueous medium at a temperature of from above the melting point of organic sulfide being prepared to the boiling point of the heterogeneous reaction mixture under reflux conditions. There is produced a reaction mixture comprising the desired organic sulfide or disulfide, depending on whether elemental sulfur is incorporated in the reaction, along with by-products and unused reactants. This reaction mass is then treated with either an aqueous medium, such as water, or a solute, such as sodium chloride, while maintaining the temperature of the mass above the melting point of the organic sulfide to effect the desired density change and consequent separation of the organic sulfide as a liquid phase. When an aqueous medium is used to effect the density change the amount of aqueous medium is dependent upon the concentration of the final reaction mixture and the density of the organic sulfide to be separated. Preferably an excess of aqueous medium over actual requirements for distinct phase separation is used since thereby the separation into two liquid phases is hastened and the possibility of emulsification eliminated. The excess aqueous medium is not detrimental and serves to partially wash the organic sulfide product. For this purpose it is recommended that from 20 to 40% by weight of aqueous medium over the actual required amount be used. Water is the preferred aqueous medium.

When the addition of a solute is utilized to effect the density change, the solute must be soluble in the aqueous phase of the reaction mass and insoluble in the liquid organic sulfide. In conducting the separation by use of a solute, the density of the reaction mass is increased and the organic sulfide becomes the super-natant liquid layer. Sodium chloride is the preferred solute, although any solute which meets the above requirements and does not contaminate the organic sulfide product may be used. The addition of the solute is carried out gradually while maintaining the reaction mass at a temperature above the melting point of the organic sulfide thus preventing its solidification. The upper limit of the temperature is the boiling point of the reaction mass. If dibenzyl disulfide is the product being prepared it is preferred to maintain the reaction mass at about 170° to 175° F.

In general from 5 to 10% by weight of solute is sufficient to bring about a density increase which allows the organic sulfide to assume a distinct upper liquid layer. The use of an excess of solute over these limits is not detrimental. The amount of solute necessary for distinct phase separation is easily determined from samples of the reaction mass on completion of the reaction.

Although the invention has been described as applicable to a general class of organic sulfide compounds, it is best illustrated by the preparation of dibenzyl disulfide through the reaction of benzyl chloride and sodium sulfide in a water solution containing excess sulfur. The following example sets forth this embodiment of the present invention along with other details and is to be considered as illustrative only.

*Example 1.*—An aqueous solution of sodium disulfide was prepared by dissolving 7.5 pounds of sodium sulfide in 73 pounds of water, heated to about 210° F. in an open kettle, and adding with agitation, 3.0 pounds of sulfur. The agitation was continued for a few minutes to insure completion of the reaction and then the solution was cooled to about 165° to 175° F. The solution at this point had a density of 1.0906. While maintaining the temperature of 165° to 175° F., 16.5 pounds of benzyl chloride (density 1.0710) were added slowly over a period of about two hours with continued agitation. Since the density of benzyl chloride is less than the sodium disulfide solution, agitation is necessary to insure intimate contact of reactants in this heterogeneous system. Upon completion of the reaction the aqueous phase had a density of about 1.0746. The final reaction mass was then diluted with 20 pounds of water heated to about 170° F. During the dilution the temperature was maintained at substantially 170° to 175° F. After thoroughly mixing the water with the reaction mass, the agitation was stopped. The liquid dibenzyl disulfide having a density of about 1.0929 was allowed to settle as the lower liquid phase and drawn off in liquid form as the lower drum. A yield of 86%, based on benzyl chloride reacting, or 27.6 pounds was obtained. The product had a purity of about 98% and contained about 25.5% sulfur.

From this example it is apparent that it is only necessary to add sufficient aqueous medium to bring about a density differential of approximately 0.03 to 0.05 in order to attain distinct phase separation and accumulation of the product dibenzyl disulfide as the lower liquid layer. However, as before, an excess of water over these minimum requirements is recommended. The separation of the liquid organic sulfide product may be made continuous by using several reactors and continuously drawing off the hot final reaction mass for treatment to effect the density change herein described and continuously separating the phases by means of a centrifugal separator.

The aqueous phase which has been separated from the reaction mass, upon dilution, will contain small quantities of by-products, impurities, unreacted benzyl chloride, and a substantial quantity of unreacted excess sodium disulfide. For this reason, the aqueous phase or mother liquor may be used in making up subsequent reaction mixtures of sodium sulfide, benzyl chloride, and sulfur. This procedure not only conserves reactants, but lessens the amount of waste disposal.

It may be desirable after the initial separation of the organic sulfides to draw off the product into a second kettle or vessel for further purification, depending upon the end use for which it is intended. After one water wash to remove the majority of impurities, the liquid organic sulfide may be stored as such or used directly for compounding purposes. Further purifications, including washing the dibenzyl disulfide with a 1% sodium sulfide solution to remove any impurities such as free sulfur and mercaptans is readily accomplished while the product is still in the liquid form. These last purification steps are conducted using the principles of phase separation which have been described. In other words, the liquid organic sulfide will in each case assume a separate liquid layer and the purification is conducted at temperatures above the melting point of the product. Using the methods described, yields of from 86% to 95% of organic sulfides are obtained. The product will have a purity of about 98.0% to 99.5% and contain substantially the theoretical amount of sulfur.

Dibenzenoid alkyl sulfides, prepared in accordance with this invention, are useful as extreme pressure agents in lubricating compositions. A typical example is dibenzyl disulfide, in which case it is preferred that the product be free from corrosive sulfur, have a minimum set point of 60° C., contain a minimum of about 25.5 to 25.9% sulfur based on a purity factor of from 98% to 99.5%, contain as a maximum only 0.6% hydrolizable chlorine and contain no water. Dibenzyl disulfide may be prepared on a commercial scale by the methods of this invention and the product will meet these purity requirements, after subjecting it to a wash with 1% sodium sulfide solution, followed by a water wash. For the purpose of demonstrating this aspect of the invention the following example is given.

*Example 2.*—7300 pounds of water were charged to an open kettle, fitted with a steam heating coil, means for agitation and a reflux condenser; the water was heated to 210° F. 1250 pounds of 60% pure sodium sulfide were added and the solution stirred for a few minutes to dissolve the sodium sulfide. While continuing the stirring 300 pounds of sulfur were added and dissolved in the solution and the entire mass allowed to cool to 170° F. 1650 pounds of benzyl chloride were next added slowly over a period of two hours while continually agitating the reaction mass. At this point 2000 pounds of water were added and the reaction mass maintained at about 170° F. The reaction mass was allowed to settle by ceasing the agitation and the liquid dibenzyl disulfide drawn off at about 170° F. into a second kettle. A wash of 7000 pounds of water at 170° F. was pumped into the kettle and the mixture slowly agitated for ten minutes. The lower liquid layer of dibenzyl disulfide was drawn off into drums for storage. The total processing time was about 5 hours and a yield of 86% or 1390 pounds of product was obtained.

A sample of the benzyl disulfide from Example 2 was washed with a 1% solution of sodium sulfide followed by a water wash and then subjected to the chemical and physical tests, above referred to, in order to establish its purity and suitability for compounding purposes. The results are set forth in the following Table I which makes a comparison of chemically pure dibenzyl disulfide and this sample from Example 2 in light of the manufacturing specifications for a dibenzenoid alkyl sulfide lubricating addend.

TABLE I

*Chemical and physical tests for dibenzyl disulfide*

| Test | Chemically Pure Dibenzyl Disulfide | Manufacturing Specifications | Dibenzyl Disulfide from Example 2 |
|---|---|---|---|
| 1. Sulfur Activity | light stain | light stain | very light stain. |
| 2. Set Point | 70°–71° C | 60° C. (Min.) | 65° C. |
| 3. Percent Sulfur | 26.1 | 21 to 25.5 [1] | 24.8. |
| 4. Percent Hydrolyzable Chlorine. | 0.0 | 0.6 (Max.) | 0.56. |
| 5. Percent $H_2O$ | 0.0 | 0.0 | 0.0. |

[1] Depending on product purity.

The sulfur activity is determined by preparing a 3% solution of dibenzyl disulfide in a neutral petroleum hydrocarbon and then subjecting the resulting solution to contact with a polished copper strip for one hour at 250° F. The set point was determined by cooling liquid dibenzyl disulfide with agitation. The material supercools. The temperature of the melt rises to and remains at a constant value until the solidification process is complete. This temperature value is defined as the "set point." The percent sulfur, hydrolyzable chlorine and water are determined by ordinary analytical methods. These tests, in summation, are a direct indication of product purity. The set point of the benzyl disulfide is influenced by the presence of benzyl alcohol, benzyl chloride, dibenzyl trisulfide and residual sodium disulfide impurities therein. Benzyl chloride impurities are detected by the percent hydrolyzable chlorine. The table clearly indicates that a product which meets manufacturing specifications and which very closely parallels chemically pure dibenzyl disulfide in chemical and physical characteristics, may be prepared in accordance with this invention.

Upon blending 1% by weight of benzyl disulfide into a lubricating composition containing 12% sulfurized-phosphorized fatty oil, as prepared by the method of United States Patent 2,211,306, 0.5% Acryloid 150 as a pour depressant, with neutral and bright stock hydrocarbon oils, a compatible composition is obtained. The sulfur activity of the lubricating composition was satisfactory, showing only a very light stain on the copper when tested for one hour at 250° F.

Various modifications of the procedure described herein are apparent without departing from the scope of the invention. The reaction may be conducted using sodium monosulfide in place of sodium disulfide merely by omitting the free sulfur from the reaction mixture. When sodium monosulfide is the reactant, the products are the corresponding monosulfides—as, for example, dibenzyl monosulfide. Instead of using the chlorine derivative of an alkylated aromatic, naphthalene or anthracyl compound, the bromine or iodine homologues may be used. The chlorine compounds are preferred because they are cheaper. The sulfides and polysulfides of other alkali metals instead of sodium may also be used but here again economic considerations point to the sodium sulfides as the preferred reactant. Although Example 1 recites that the dilution water is heated to about 170° F. before addition to the reaction mass, this procedure is not essential to the success of the process. Cold water may be used for the dilution as long as the reaction mass is maintained at a temperature above the melting point of the organic sulfide. In using the present process to prepare and separate organic sulfide compounds having melting points above the boiling point of the aqueous phase of the reaction mixture in which they are produced, it is possible to effect a separation at elevated temperatures and under sufficient pressure to prevent volatilization of the aqueous phase.

Specific embodiments and examples have been used to demonstrate the present invention, but it is not to be limited thereby and the only limitations appear in the following claims.

What is claimed is:

1. The process for separating organic sulfide compounds selected from the group consisting of alkyl dibenzenoid sulfides, dialkyl naphthalene sulfides and dialkyl anthracene sulfides from a water system in which said organic sulfides have been produced, said compounds having densities near that of the water phase of the system and having melting points below the boiling point of the water phase comprising adding an agent selected from the group consisting of water and sodium chloride to said system to alter the density of said water phase at a temperature above the melting point of said compounds sufficiently to cause separation of said compounds as a separate liquid phase.

2. The process in accordance with claim 1 in which the added agent is water.

3. The process in accordance with claim 1 in which the added agent is sodium chloride.

4. The process in accordance with claim 1 in which the organic sulfide compound is an alkyl dibenzenoid sulfide.

5. The process in accordance with claim 4 in which the alkyl dibenzenoid sulfide is dibenzyl disulfide.

6. The process for separating organic sulfide compounds selected from the group consisting of alkyl dibenzenoid sulfides, dialkyl naphthalene sulfides and dialkyl anthracene sulfides from a water system in which said organic sulfides have been produced, said compounds having densities near that of the water phase of the system and having melting points below the boiling point of the water phase comprising adding an agent selected from the group consisting of water and sodium chloride to said system to bring about a density differential between said aqueous phase and said compounds of at least about 0.03 while said system is at a temperature above the melting point of said compounds thereby separating said compounds as a separate liquid phase.

7. The process in accordance with claim 6 in which the added agent is water.

8. The process in accordance with claim 7 in which about 20% to 40% by weight of water is added in excess of the amount required to obtain the density differential.

9. The process in accordance with claim 6 in which the added agent is sodium chloride.

10. The process in accordance with claim 9 in which about 5% to 10% by weight of sodium chloride based on the weight of said water system is added to obtain the density differential.

11. The process for the production of organic sulfides selected from the group consisting of alkyl dibenzenoid sulfides, dialkyl naphthalene sulfides and dialkyl anthracene sulfides comprising reacting a heterogeneous system composed of the corresponding organic halide and an aqueous alkali metal sulfide containing an excess of alkali metal sulfide over stoichiometric requirements, with agitation at a temperature at least above the melting point of said organic sulfides and recovering said organic sulfides from said system by adding an agent selected from the group consisting of water and sodium chloride to alter the density of the aqueous phase therein while maintained at a temperature above the melting point of said organic sulfides, thereby removing said organic sulfide as a separate liquid phase having a density less than said aqueous phase.

12. The process in accordance with claim 11 in which the added agent is water.

13. The process in accordance with claim 11 in which the added agent is sodium chloride.

14. The process in accordance with claim 11 in which the organic sulfide compound is an alkyl dibenzenoid sulfide.

15. The process in accordance with claim 14 in which the alkyl dibenzenoid sulfide is dibenzyl disulfide.

16. The process of preparing dibenzenoid alkyl sulfides in which two alkyl phenyl groups are joined through alkyl groups by at least one sulfur atom comprising, reacting a benzenoid alkyl halide with a compound of an alkali metal with sulfur having at least one sulfur atom per molecule in a water system, mechanically agitating said system at a temperature above the melting point of said sulfides and separating said sulfides by adding an agent selected from the group consisting of water and sodium chloride to alter the density of the water phase of said system and removing said sulfides as a separate liquid phase having a density less than said water phase.

17. The method in accordance with claim 16 in which the dibenzenoid alkyl sulfide is dibenzyl disulfide, said alkali metal compound is sodium polysulfide and said added agent is water.

18. The method in accordance with claim 17 in which the added agent is sodium chloride.

19. The process for preparing dibenzyl disulfide comprising reacting an aqueous heterogeneous reaction system composed of a water solution of sodium sulfide containing sulfur and benzyl chloride in at least stoichiometric amounts in the absence of any solvent for the reactants, at a temperature of about 165° F., agitating the system until completion of the reaction forming an aqueous phase and a sulfide phase and separating said sulfide phase by adding an agent selected from the group consisting of water and sodium chloride to said system to bring about a density differential in said aqueous phase of at least about 0.03 while maintaining said system at a temperature above the melting point of said dibenzyl disulfide, said agent being soluble only in said aqueous phase, and recovering the dibenzyl disulfide as a separate liquid phase.

20. The process in accordance with claim 19 in which said agent is water.

21. The process in accordance with claim 19 in which said agent is sodium chloride.

References Cited in the file of this patent
UNITED STATES PATENTS

| Number | Name | Date |
|---|---|---|
| 2,113,092 | Moran et al. | Apr. 5, 1938 |
| 2,113,093 | Moran et al. | Apr. 5, 1938 |
| 2,185,007 | Wojcik | Dec. 26, 1939 |
| 2,185,008 | Wojcik | Dec. 26, 1939 |
| 2,309,654 | Leum et al. | Feb. 2, 1943 |
| 2,510,921 | Bauer | June 6, 1950 |
| 2,538,941 | Macullum | Jan. 23, 1951 |
| 2,594,935 | Ladd et al. | Apr. 29, 1952 |